United States Patent Office 3,592,900
Patented July 13, 1971

3,592,900
METHOD FOR LOWERING ELEVATED BLOOD SUGAR LEVELS USING A DIHYDROPYRIDINE HYDROHALIDE
John B. Bicking, Lansdale, Pa., assignor to Merck & Co., Inc., Rahway, N.J.
No Drawing. Filed Aug. 12, 1968, Ser. No. 751,732
Int. Cl. A61k 27/00
U.S. Cl. 424—263
6 Claims

ABSTRACT OF THE DISCLOSURE

A method for lowering elevated blood sugar levels in warm-blooded animals by the administration of a 1-(aralkyl or aralkenyl)-4-imino-1,4-dihydropyridine hydrohalide is described. The hypoglycemic agents are prepared by the reaction of an aralkyl or aralkenyl halide with 4-amino-pyridine. The aralkyl or aralkenyl halide as well as the 4-aminopyridine optionally can be substituted.

This invention is concerned with a method for lowering elevated blood sugar levels in warm-blooded animals by the administration of a 1-(phenalkyl, phenalkenyl or 2-pyridylalkyl)-4-imino-dihydropyridine hydrohalide.

The agents found useful in the process of this invention can be illustrated by the following structural formula

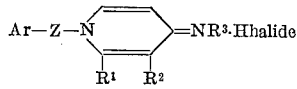

wherein Ar represents 2-pyridyl, phenyl or substituted phenyl wherein the substituents are selected from lower alkyl having from 1 to 3 carbon atoms, lower alkoxy having from 1 to 3 carbon atoms, halogen particularly chloro and bromo and trifluoromethyl, Z represents lower alkyl having from 1 to 3 carbon atoms or lower alkenyl having 3 carbon atoms, $R^1$, $R^2$ and $R^3$ separately represent hydrogen and lower alkyl having from 1 to 3 carbon atoms and Hhalide represents hydrochloride and hydrobromide.

These active hypoglycemic products can advantageously be prepared by heating an Ar-Z-chloride or -bromide and a 4-aminopyridine of the structure

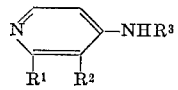

in a solvent such as a lower alkanol.

An important feature of this invention resides in the high order of activity of the hypoglycemic agents when administered orally. It has been found that marked lowering of the blood sugar in diabetic rats is effected at relatively low dosages of the order of 25 mgs./kg. and that no gross toxic symptoms are observed at this dosage level. Acute toxicity studies establish a quite favorable therapeutic index for the compounds, the actual data obtained for each of them being given in Table II, below.

Treatment to lower the elevated blood sugar levels of animals (hereinafter referred to as diabetic animals) can be effected by the administration of the selected agent in the form of powders, granules, wafers, tablets, capsules and pills or other suitable dosage forms containing from about 5 mgs. to about 25 mgs. per unit dosage for single or multiple administration on a one to four times a day basis at the discretion of the physician. These dosage forms can be prepared by conventional methods known to those skilled in the art as will be illustrated by the examples.

The preparation of the hypoglycemic agents employed in the process of this invention is described in the following examples.

EXAMPLE 1

1-phenethyl-4-imino-1,4-dihydropyridine hydrochloride

A solution of 4-aminopyridine (23.5 g., 0.25 mole) and phenethyl chloride (49.3 g., 0.35 mole) in 200 ml. of ethanol is boiled under reflux for 18 hours. The crystalline product precipitates toward the end of this period. The mixture is then cooled, and the product collected and recrystallized from methanol to obtain 29.0 g. (49%) of 1-phenethyl-4-imino-1,4-dihydroypridine hydrochloride, M.P. 271.5–273.5° C.

Analysis.—Calculated for $C_{13}H_{14}N_2 \cdot HCl$ (percent): C, 66.52; H, 6.44; N, 11.94. Found (percent): C, 66.79; H, 6.29; N, 11.87.

EXAMPLE 2

1-phenethyl-4-methylimino-1,4-dihydropyridine hydrobromide

A mixture of 4-methylaminopyridine (4.86 g., 0.045 mole), phenethyl bromide (9.99 g., 0.054 mole) and isopropyl alcohol (10 ml.) is boiled under reflux with stirring for 6 hours.

The reaction mixture is concentrated to dryness under reduced pressure to give a cream colored solid, M.P. 180–183° C. Recrystallization from isopropyl alcohol gives 10.16 g. (77%) of white prisms, M.P. 184–186° C.

Analysis.—Calculated for $C_{14}H_{16}N_2 \cdot HCl$ (percent): C, 57.35; H, 5.84; N, 9.55. Found (percent): C, 57.32; H, 5.71; N, 9.71.

EXAMPLE 3

1-(2-pyridylmethyl)-4-imino-1,4-dihydropyridine hydrochloride

To an ice-cold solution of 2-chloromethylpyridine hydrochloride (10.7 g., 0.005 mole) in 30 ml. of water is added 25 ml. of a 40% solution of sodium hydroxide in water. The oily 2-chloromethylpyridine is extracted into 80 ml. of benzene. To this solution is added 4-aminopyridine (4.7 g., 0.05 mole) and 40 ml. of isopropyl alcohol. The resulting solution is boiled under reflux for one hour and then is chilled. The crystalline product which separates is collected and recrystallized from isopropyl alcohol to yield 5.1 g. (46%) of 1-(2-pyridylmethyl)-4-imino-1,4-dihydropyridine hydrochloride, M.P. 176–177.5° C.

Analysis.—Calculated for $C_{11}H_{11}N_3 \cdot HCl$ (percent): C, 59.59; H, 5.46; N, 18.95. Found (percent) C, 59.53; H, 5.37; N, 18.68.

EXAMPLE 4

1-cinnamyl-4-imino-1,4-dihydropyridine hydrobromide

A solution of 4-aminopyridine (4.7 g., 0.05 mole) and cinnamyl chloride (8.5 g., 0.055 mole) in 20 ml. of isopropyl alcohol is boiled under reflux for 25 minutes. The solution is let to stand at room temperature while product crystallizes. The product is collected and recrystallized from ethanol-ethyl acetate to obtain 5.8 g. (47%) of 1-cinnamyl-4-imino-1,4-dihydropyridine hydrobromide, M.P. 201.5–204.5° C.

Analysis.—Calculated for $C_{14}H_{14}N_2 \cdot HCl$ (percent): C, 68.14; H, 6.13; N, 11.36. Found (percent): C, 68.01; H, 5.91; N, 11.36.

Additional effective hypoglycemic agents that are contemplated to be employed in the process of this invention are prepared by the process described in Example 1 by employing the 4-aminopyridine and the aralkyl halide identified in Table I.

TABLE I

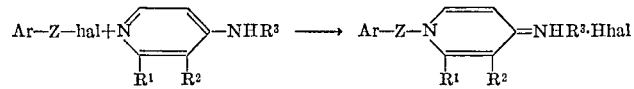

| Example No.: | Ar | Z | hal | R¹ | R² | R³ | M.P., °C. | Calculated C | H | N | Found C | H | N |
|---|---|---|---|---|---|---|---|---|---|---|---|---|---|
| 5 | ⟨phenyl⟩ | —CH₂CH₂— | Br | CH₃ | H | H | 222–223 | 57.35 | 5.84 | 9.55 | 57.53 | 5.85 | 9.56 |
| 6 | Same as above | —CH₂—CH₂— | Br | H | CH₃ | H | 231–232 | 57.35 | 5.84 | 9.55 | 57.22 | 5.66 | 9.54 |
| 7 | CH₃—⟨phenyl⟩ | —CH₂— | Cl | H | H | H | 249.5–252.5 | 66.52 | 6.44 | 11.94 | 66.50 | 6.30 | 11.94 |
| 8 | F₃C—⟨phenyl⟩ | Same | Cl | H | H | H | 192.5–195 | 54.08 | 4.19 | 9.71 | 53.71 | 4.59 | 9.70 |
| 9 | CH₃O—⟨phenyl⟩ | do | Cl | H | H | H | 189.5–192.5 | 62.27 | 6.03 | 11.18 | 61.83 | 6.04 | 11.16 |
| 10 | Cl—⟨phenyl⟩ | —CH₂CH₂— | Br | H | H | H | 200.5–203.5 | 49.78 | 4.50 | 8.93 | 49.57 | 4.11 | 9.00 |
| 11 | ⟨phenyl⟩ | —CH₂CH₂CH₂— | Br | H | H | H | 146–148 | 57.34 | 5.85 | 9.56 | 57.21 | 5.69 | 9.54 |

The active agents of the process of this invention have been found, in standard laboratory measurements employing rats rendered diabetic with the antibiotic streptozotocin to be orally active hypoglycemic agents. The procedure used to measure the blood sugar lowering properties of these agents is as follows:

Female rats (Charles River Caesarian-derived strain), 125 to 150 g. in weight, are made diabetic with a 50 mg./kg. dose of streptozotocin administered intravenously. After ten days the animals are ready for test. The animals are fasted for three hours; then, a blood sample for glucose analysis is withdrawn by orbital sinus puncture. One group of five to ten animals is then treated with the test drug either subcutaneously or orally; another group is treated with 1 unit of insulin intravenously as a reference standard. Four hours later a second blood sample is withdrawn from each animal. The blood samples are analyzed for glucose content in the Technicon Autoanalyzer. From the data obtained, percent changes in blood glucose content can be calculated.

The results obtained following the above procedure upon the administration of the hypoglycemic agents of this invention as well as upon the administration of phenformin are given in Table II together with the $LD_{50}$ data (mice) for some of the products. It is to be noted that in so far as the active agents of this invention are concerned, no gross toxic symptoms were observed in any of the animals at the dosage level employed.

TABLE II

| Product of example number | Dose, mg./kg. | Route | Percent lowering of blood glucose | $LD_{50}$ I.V., mg./kg. | $LD_{50}$ oral, mg./kg. |
|---|---|---|---|---|---|
| 1 | 25 | Subcutaneous | 50 | 11 | 31 |
|   | 5 | Oral | 32 |   |   |
|   | 10 | do | 37 |   |   |
|   | 20 | do | 67 |   |   |
|   | 30 | do | 84 |   |   |
| 2 |   |   | 40 |   |   |
| 3 |   |   | 30 |   |   |
| 4 |   |   | 61 | 24 | 187 |
| 5 |   |   | 52 | 17 | 71 |
| 6 | 25 | Subcutaneous | 16 |   |   |
| 7 |   |   | 48 | 13 | 142 |
| 8 |   |   | 40 |   |   |
| 9 |   |   | 31 |   |   |
| 10 |   |   | 35 |   |   |
| 11 |   |   | 19 |   |   |
| Phenformin | 100 | Subcutaneous | 20 | 29 | 602 |
|   | 200 | do | 65 |   |   |
|   | 200 | do | 80 |   |   |
|   | 250 | Oral | 68 |   |   |

The amount of hypoglycemic agent to be employed in the method of this invention will depend upon the age, condition, weight and other factors relevant to the diabetic animal to be treated and necessarily needs to be individualized by the physician or veternarian for each patient. A suitable unit dosage form for oral administration is described in the following example in which the active ingredient employed is the product of Example 1, 1-phenethyl-4-imino-1,4-dihydropyridine hydrochloride. It is to be understood, however, that each of the other agents contemplated to be employed in the process of this invention can similarly be used as an active ingredient in the same or other suitable formulation.

EXAMPLE 12

|   | Mgs./tablet |
|---|---|
| Active ingredient | 25 |
| Corn starch | 79 |
| Talc | 14 |
| Magnesium stearate | 2 |
| Hydroxypropylmethyl cellulose | 4 |
| Titanium dioxide | 4 |
| Propylene glycol | 1 |

Sufficient water is added to the starch to form a thick paste which then is intimately mixed with the active ingredient. If necessary, a small additional amount of water is added for thorough mixing of the ingredients and thereafter the water is removed by drying in an oven. After thorough drying, the material is ground, the magnesium stearate and talc are added and intimately mixed with the ground material and the mixture then is passed through a No. 10 screen and compressed into tablets. The hydroxypropylmethylcellulose and titanium dioxide are suspended in the propylene glycol and then mixed with a mixture of alcohol and chloroform (50:50) which is used as the film-coating pan in which the tablets are rotating thereby film coating the tablets.

Other formulations comprsing more or less of active ingredient can be prepared by conventional methods for oral or parenteral administration.

What is claimed is:

1. A method for lowering the elevated blood sugar level of warm-blooded animals comprising the administration to a warm-blooded animal having an elevated blood sugar level an effective, nontoxic amount of at least 5 mgs./kg. of a hypoglycemic agent having the structural formula

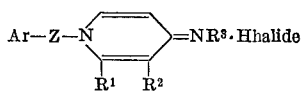

wherein Ar is selected from the group consisting of 2-pyridyl, phenyl, lower alkoxyphenyl, lower alkylphenyl, chlorophenyl, bromophenyl, and trifluoromethyl-phenyl, Z is selected from a $C_{1-3}$ alkyl and $C_3$-alkenyl, $R^1$, $R^2$, and $R^3$ are separately selected from the group consisting of hydrogen and lower alkyl and halide is selected from chloro and bromo.

2. A method as claimed in claim 1 wherein the hypoglycemic agent is 1-phenethyl-4-imino-1,4-dihydropyridine hydrochloride.

3. A method as claimed in claim 1 wherein the hypoglycemic agent is 1-phenethyl-4-methylimino-1,4-dihydropyridine hydrobromide.

4. A method as claimed in claim 1 wherein the hypoglycemic agent is 1-cinnamyl-4-imino-1,4-dihydropyridine hydrobromide.

5. A method as claimed in claim 1 wherein the hypoglycemic agent is 1-phenethyl-2-methyl-4-imino-1,4-dihydropyridine hydrobromide.

6. A method as claimed in claim 1 wherein the hypoglycemic agent is 1-(p-methylbenzyl)-4-imino-1,4-dihydropyridine hydrochloride.

References Cited

UNITED STATES PATENTS 3,341,413   9/1967   Tocus et al. _____ 424—263

JEROME D. GOLDBERG, Primary Examiner